United States Patent [19]

Lehnert et al.

[11] Patent Number: 5,371,989
[45] Date of Patent: Dec. 13, 1994

[54] USE OF FIBROUS MAT-FACED GYPSUM BOARD IN EXTERIOR FINISHING SYSTEMS FOR BUILDINGS AND SHAFT WALL ASSEMBLIES

[75] Inventors: Charles W. Lehnert, Fort Myers, Fla.; Brian G. Randall, Stone Mountain, Ga.

[73] Assignee: Georgia-Pacific Corporation, Atlanta, Ga.

[21] Appl. No.: 838,551

[22] Filed: Feb. 19, 1992

Related U.S. Application Data

[60] Continuation of Ser. No. 626,381, Dec. 12, 1990, abandoned, which is a continuation of Ser. No. 319,638, Mar. 6, 1989, abandoned, which is a division of Ser. No. 20,872, Mar. 2, 1987, Pat. No. 4,810,569, which is a division of Ser. No. 583,874, Feb. 27, 1984, Pat. No. 4,647,496.

[51] Int. Cl.⁵ .................................................. E04C 1/00
[52] U.S. Cl. ............................... 52/309.17; 52/309.15; 428/70; 428/74
[58] Field of Search ..................... 52/309.15, 309.17; 428/70, 79, 77, 126–130, 193–194, 236

[56] References Cited

U.S. PATENT DOCUMENTS

| | | |
|---|---|---|
| 1,787,163 | 12/1930 | New . |
| 2,206,042 | 7/1940 | Novak . |
| 2,238,017 | 4/1941 | Duncan . |
| 2,560,521 | 7/1951 | Camp . |
| 2,633,441 | 3/1953 | Buttress . |
| 2,954,302 | 9/1960 | Gorman . |
| 3,185,297 | 5/1965 | Rutledge . |
| 3,284,980 | 11/1966 | Dinkel . |
| 3,289,371 | 12/1966 | Pearson et al. . |
| 3,391,037 | 7/1968 | McNulty . |
| 3,607,486 | 9/1971 | Jacks et al. . |
| 3,666,581 | 5/1972 | Lane .................... 156/39 |
| 3,830,687 | 8/1974 | Re et al. . |
| 3,929,947 | 12/1975 | Schwartz . |
| 3,935,021 | 1/1976 | Greve et al. ............ 106/111 |

(List continued on next page.)

FOREIGN PATENT DOCUMENTS

| | | |
|---|---|---|
| 721719 | 11/1965 | Canada . |
| 794590 | 9/1968 | Canada . |
| 0993779 | 7/1976 | Canada .................... 156/42 |
| 993779 | 7/1976 | Canada . |
| 1033123 | 6/1958 | Germany . |
| 1223287 | 9/1964 | Germany . |
| 2008744 | 2/1970 | Germany . |
| 1509853 | 4/1970 | Germany . |
| 7806114 | 4/1979 | Germany . |
| 2755879 | 6/1979 | Germany . |
| 2808723 | 9/1979 | Germany . |
| 155679 | 12/1971 | New Zealand . |
| 772581 | 4/1957 | United Kingdom . |
| 1204541 | 9/1970 | United Kingdom . |
| 1520411 | 8/1978 | United Kingdom . |
| 2004807 | 4/1979 | United Kingdom . |
| 2013563 | 8/1979 | United Kingdom . |
| 2053779 | 2/1981 | United Kingdom . |

OTHER PUBLICATIONS

"Bauwirtschaft" H38, 1982, pp. 1401–1410, including a translation into English.

(List continued on next page.)

Primary Examiner—Carl D. Friedman
Assistant Examiner—Beth A. Aubrey
Attorney, Agent, or Firm—Synnestvedt & Lechner

[57] ABSTRACT

An exterior finishing system for a building, including particularly an exterior insulation system, which includes a fibrous mat-faced gypsum board, preferably a board in which the set gypsum core thereof is water resistant, and preferably one in which the set gypsum core is sandwiched between two sheets of porous glass mat, with the outer surface of at least one of said mats being substantially free of set gypsum, and means for preparing the board, including control of the viscosity of the aqueous gypsum slurry from which the set gypsum core of the board is formed. Also, the use of fibrous mat-faced gypsum board as the shaft liner panel in a shaft wall assembly.

25 Claims, 2 Drawing Sheets

U.S. PATENT DOCUMENTS

| | | |
|---|---|---|
| 3,941,632 | 3/1976 | Swedenberg et al. . |
| 3,944,698 | 3/1976 | Dierks et al. . |
| 3,947,398 | 3/1976 | Williams ........................ 260/29.6 S |
| 3,964,944 | 6/1976 | Gwynne ............................ 428/70 X |
| 3,993,822 | 11/1976 | Knauf et al. . |
| 4,020,237 | 4/1977 | von Hazmburg . |
| 4,047,355 | 9/1977 | Knorr . |
| 4,065,333 | 12/1977 | Lawlis et al. . |
| 4,065,597 | 12/1977 | Gillespie . |
| 4,073,997 | 2/1978 | Richards et al. . |
| 4,128,699 | 12/1978 | Kole et al. . |
| 4,148,781 | 4/1979 | Narukawa et al. . |
| 4,181,767 | 1/1980 | Steinau . |
| 4,187,130 | 2/1980 | Kautz . |
| 4,195,110 | 3/1980 | Dierks et al. . |
| 4,203,788 | 5/1980 | Clear . |
| 4,238,445 | 12/1980 | Stone ................................. 264/234 |
| 4,242,406 | 12/1980 | Bouhnini . |
| 4,252,568 | 2/1981 | Bounini ............................ 106/111 |
| 4,265,979 | 5/1981 | Baehr et al. . |
| 4,296,169 | 10/1981 | Shannon . |
| 4,303,722 | 12/1981 | Pilgrim . |
| 4,324,082 | 4/1982 | Rutkowski et al. . |
| 4,335,177 | 6/1982 | Takeuchi . |
| 4,344,804 | 8/1982 | Bijen et al. . |
| 4,344,910 | 8/1982 | Bijen . |
| 4,351,867 | 9/1982 | Mulvey et al. . |
| 4,361,616 | 11/1982 | Bomers . |
| 4,364,212 | 12/1982 | Pearson et al. . |
| 4,378,405 | 3/1983 | Pilgrim . |
| 4,403,006 | 9/1983 | Bruce et al. . |
| 4,477,300 | 10/1984 | Pilgrim . |
| 4,504,533 | 3/1985 | Altenhofer et al. . |

OTHER PUBLICATIONS

"Baustofftechnik Feb. 1982," including a translation of portions thereof into English.

"der baustoffmarkt Jan. 1982," including a translation of portions thereof into English.

Hesterberg Affidavit dated Jan. 24, 1994, including a translation thereof into English.

Neuhauser Affidavit (Affidavit I) dated Jan. 24, 1994, including a translation thereof into English.

Neuhauser Affidavit (Affidavit II) dated Jan. 24, 1994, including a translation thereof into English and color copies of attached photographs.

Forderungskatalog, including a translation of portions thereof into English.

Warmedammuerbundsysteme Sep. 1982, including a translation of portions thereof into English.

Freudenberg letter, May 6, 1982, including a translation thereof into English.

Programme, including a translation of portions thereof into English.

News Bulletin of the Exterior Insulation Manufacturers Association, Spring, 1982; Fall, 1982, and Winter, 1983.

"Focus on Insulation", Buildings, pp. 72–74, (Feb., 1983).

*Modern Plastics*, "Opportunity Knocks—And Loudly—For Extruded PS Foam Board", Dec., 1978, pp. 46–47.

"Fire Resistant Gypsum Sheathing", (undated), Brochure No. GA–252–84 of the Gypsum Association.

"Glasfaservliese" (Glass Fibre Mats) by J. Hansmann.

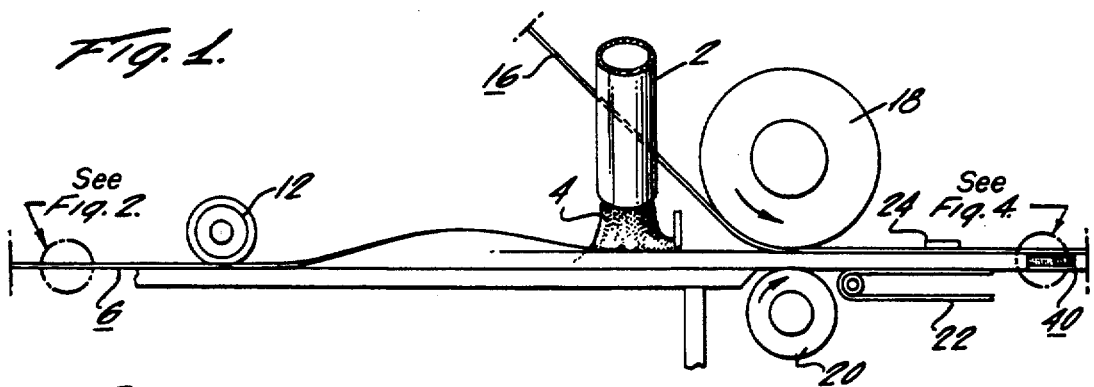
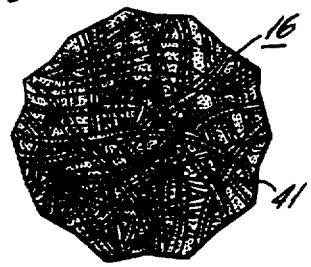
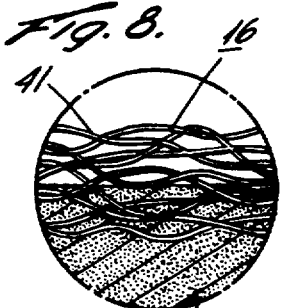
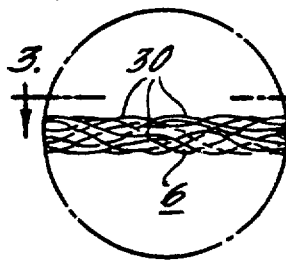
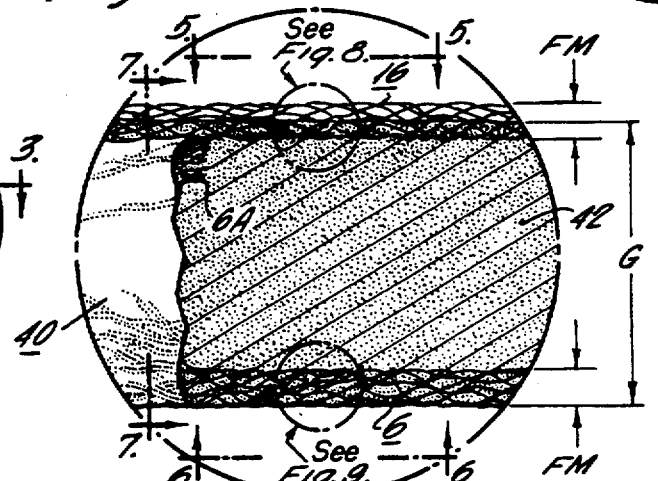
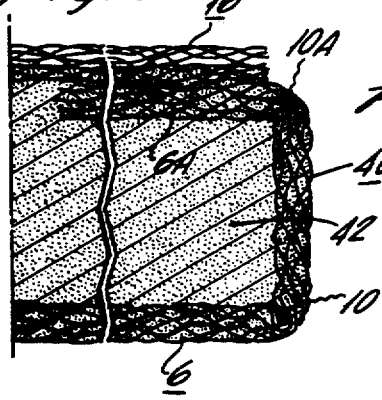
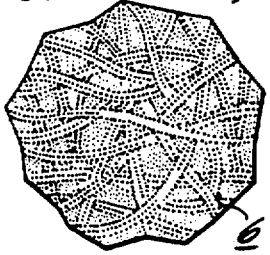
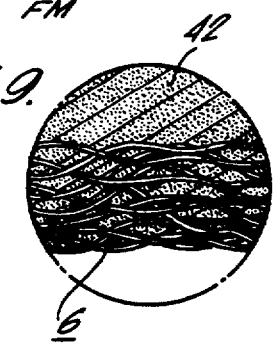

USE OF FIBROUS MAT-FACED GYPSUM BOARD IN EXTERIOR FINISHING SYSTEMS FOR BUILDINGS AND SHAFT WALL ASSEMBLIES

CROSS REFERENCE TO RELATED APPLICATION

This application is a continuation application of co-pending U.S. Ser. No. 07/626,381, filed Dec. 12, 1990 now abandoned, which in turn is a continuation application of application Ser. No. 07/319,638, filed Mar. 6, 1989 now abandoned, which in turn is a divisional application of Ser. No. 07/020,872, filed Mar. 2, 1987, now U.S. Pat. No. 4,810,569, which in turn is a divisional application of Ser. No. 06/583,874, filed Feb. 27, 1984, now U.S. Pat. No. 4,647,496.

FIELD OF THE INVENTION

This invention relates to improvements in exterior finishing systems such as, for example, exterior insulation systems for buildings, and also to improvements in shaft wall assemblies for buildings. More particularly, this invention relates to an improved structural component for use as a support surface in an exterior finishing system, including an exterior insulation system (sometimes referred to herein for convenience as "EISystem). In addition, the present invention encompasses improvements in hollow shaft wall assemblies, for example, those used in constructing elevator shafts and stairwells.

This invention will be described initially in connection with its use in EISystems, but, as will be explained hereinafter, its use has wider applicability.

EISystems are presently being used more and more widely to insulate existing buildings and buildings under construction including industrial, commercial, municipal, institutional, and residential buildings. Installation of a typical EISystem in new construction generally involves the following sequential steps: (A) constructing a frame for support of the outside wall of a building; (B) affixing to the frame structural panels to provide a smooth continuous surface for the support of other of the components of the EISystem; (C) affixing to the support surface panels of insulation; and (D) affixing to the panels of insulation a mesh-like material which in turn is covered with an exterior finishing material having weathering and aesthetic properties. Such systems are designed to be not only highly insulative in character and attractive in appearance, but also weather resistant. EISystems can be used to advantage to conserve energy used for heating and to conserve energy used for air-conditioning.

EISystems have inherent advantages over interior insulating systems and, in addition, they can be used to better advantage than interior insulating systems in many applications.

For example, the range of temperature variation in structural components comprising the walls of a building insulated from the outside is less than that for such components in a building which is insulated from the inside. Accordingly, such structural components when insulated from the outside are subjected to significantly lower amounts of stress caused by thermal expansion and contraction than those insulated from the inside. This is particularly advantageous in applications where the structural components comprise materials having markedly different coefficients of expansion, as is often the case. In addition, the interior space in a building having an EISystem tends to have a more uniform temperature and be less drafty than that of a building insulated from the inside.

Certain buildings are not capable of being insulated from the interior except that valuable inside space is lost to the system. The installation of an EISystem does not disturb the inside space of the building.

An EISystem can be used also to modernize or otherwise renovate the exterior of a building in need of renovation. Various of the EISystems which are commercially available give the architect a wide range of aesthetically pleasing designs from which to choose. In addition, the cost of installing an EISystem is relatively low when there is taken into account both the costs of other systems and the improved thermal efficiencies that can be realized. The relatively light weight of both the insulation and the exterior finish in an EISystem is particularly advantageous in new construction because of reduced foundation requirements.

There are, however, problems associated with the design and/or installation of EISystems. As will be discussed in detail below, various of the problems stem from the type of material which is used as the supporting member for the insulating and exterior finishing materials of the system. The present invention involves improvements in such supporting member.

REPORTED DEVELOPMENTS

As mentioned above, a typical EISystem includes a supporting member to which there is affixed insulating material, which in turn is covered with an exterior finishing material. An exemplary EISystem includes a wood or metal frame which is mechanically held in place by nails or screws to appropriate structural members of the building, with panels of the supporting member in turn mechanically affixed by nails or screws to the frame. The supporting member, which typically consists of a smooth continuous surface comprising individual panels of material positioned in abutting relationship, must be strong enough to carry the weight of the components which overlie it, including the insulating and exterior finishing materials. Although low density, light weight insulating panels of expanded polystyrene are used widely in such systems, the exterior finishing material is generally a much denser and heavier weight material, for example, an acrylic resin/cement coating that may include decorative aggregate embedded therein.

Certain of the commercialized EISystems include the use of panels of a Portland cement-based composition as the structural member for the support of the overlying panels of insulation and exterior finishing material. It is believed that such cement-based panels are described in U.S. Pat. No. 3,284,980 which discloses a building panel comprising a core consisting of a mixture of hydraulic cement and light-weight aggregate (for example, perlite) sandwiched between sheets of fibrous material (for example, woven glass fiber screen), which are adhered to the faces of the core by separate layers of bonding material containing at least 50% hydraulic cement. Although the cores of such panels include a light-weight aggregate, the panels are nevertheless relatively heavy. For example, a panel 3'×4' and 7/16" in thickness weighs about 40½ pounds. The handling and installation of such panels lead to the consumption of relatively large amounts of energy. This is a burden to workmen and makes transportation of the panels relatively costly.

A material which is used more widely in EISystems than the aforementioned cement board is gypsum board, that is, panels comprising a core of set gypsum (calcium sulfate dihydrate) sandwiched between paper cover sheets. The particular type of gypsum board that is recommended for use in EISystems is known as "gypsum sheathing" which is gypsum board designed for use on the exterior of buildings where it serves as an underlying surface which is covered with such materials as aluminum, wood siding, Portland cement stucco and, in the case of an EISystem, with insulating and exterior finishing materials. Conventional gypsum sheathing, as opposed to conventional gypsum wallboard for use in the interior of a building, includes a set gypsum core which contains one or more additives which improve the water resistance of the set core. The gypsum core of commercially available wallboard can absorb as much as 40–50 wt. % water when immersed therein at a temperature of 70° F. for about 2 hours. As the absorption of water tends to substantially reduce the strength of the core, materials which reduce the tendency of the core to absorb water are included therein. In addition, sheathing has water-repellant paper cover sheets which shed water. This is temporary protection for the sheathing before it is installed and before it is covered with the exterior finishing material.

Gypsum sheathing has many desirable characteristics which make it suitable for use in an EISystem. For example, such sheathing has relatively good fire-resistant properties, it is relatively light in weight, it has satisfactory water-resistant properties and it can be mechanically affixed in convenient fashion to a metal or wooden frame which underlies the sheathing.

Notwithstanding the aforementioned, concerns have been expressed respecting the use of such gypsum sheathing in EISystems. By way of background, it is noted that it is conventional in the industry to affix panels of insulating material to the underlying support of gypsum sheathing by the use of an adhesive material and, in turn, to affix by the use of adhesive materials each of the plies which overlie the panels of insulation. Except for the use of mechanical fastening means in the construction of the frame of the building and in affixing the gypsum sheathing to the frame, all of the components of the EISystem are in effect glued together.

Tests designed to evaluate the cohesive strength of and the adhesive strengths between the various components comprising the EISystem have shown that initial failure (pulling apart) of the system occurs not in any of the adhesive layers, but in the paper cover sheet of the gypsum sheathing. Such cover sheet consists of multi-ply paper, for example, as many as 7 layers of paper adhered together in a form that appears to the eye to be a monolithic sheet of paper. Accordingly, the cohesive strength of the paper can be characterized as the weak portion of the system.

Another concern respecting the use of gypsum sheathing in EISystems of the aforementioned type is that water leakage through the system can lead to the deterioration of the bond between the paper cover sheet and the gypsum core. (Although the system is designed to be waterproof, there are circumstances where defects in one or more plies of the system and/or unusually severe environmental conditions are the cause of water seepage.) It should be appreciated that deterioration of this bond can lead to cracking of the exterior finish, and possibly even collapse of portions of the system as the component which is adhered to the paper cover sheet pulls apart.

In an effort to overcome the aforementioned type problems, it has been proposed to affix the insulating material to the underlying gypsum sheathing by the use of mechanical fasteners which extend through the insulating material, the core of the gypsum sheathing, and into the frame. This approach to the problem has the disadvantage that the work time involved in installing the system is increased significantly inasmuch as it is much more time consuming to install fasteners than to apply an adhesive. Another shortcoming of the fastener approach is that the fasteners provide paths for the flow of water which may penetrate the system and weaken the bond between the paper cover sheet and gypsum core, as mentioned above.

Irrespective of how the insulating material is affixed to the underlying gypsum sheathing, there is another problem connected with the use of sheathing in EISystems. Because of its susceptibility to degradation by water, care must be taken to protect the sheathing from rain and other moisture conditions which may be encountered as the sheathing is stored at the job site awaiting use and during installation. Taking such protective precautions consumes time, causes inconvenience, and sometimes causes delays in installation of the system—all of which tend to increase costs.

Although gypsum sheathing has a water-repellant paper surface which provides some limited protection against water degradation, this type of surface forms a relatively poor bond with water-based adhesives which are used to adhere to the surface other components of the EISystem.

The present invention is directed to use in EISystems of a support member comprising an improved gypsum-based structural component which is modified in a manner such that problems of the type associated with the use of conventional gypsum sheathing are either overcome or alleviated significantly.

SUMMARY OF THE INVENTION

In accordance with the present invention, there is provided an improved structural support element comprising a fibrous mat-faced gypsum support surface for use in an exterior finishing system, including exterior insulating systems, for buildings. One embodiment of the present invention comprises an exterior insulation system for a building which includes a fibrous mat-faced gypsum support surface facing away from said building, insulating material having an inner surface and an outer surface, the inner surface of which is adhered to said support surface by an adhesive material, the insulating material being substantially free of channels penetrating therethrough and between said inner and outer surfaces, and exterior finishing material overlying the outer surface of said insulating material. The preferred form of fibrous mat for use in the present invention is a glass fiber mat in which filaments of glass fiber are bonded together by an adhesive.

Preferably, the fibrous mat-faced gypsum support surface comprises a gypsum core having one or more additives therein which improve the water resistance of the core. As will be seen from examples reported below, a structural member comprising a water-resistant gypsum core faced with glass mat, which itself is hydrophobic, has outstanding weathering characteristics.

An additional preferred form of the present invention comprises a gypsum board having each of its core faces covered with a porous glass fiber mat, with the mat of one of the faces being adhered to the core by set gypsum penetrating but part-way into the thickness of the mat and having its outer surface substantially free of set gypsum. As will be described below, the glass fiber mat surface, which is free of set gypsum, provides an excellent substrate to which overlying panels of insulation can be adhered.

In one embodiment of the above form of the invention, the outer surface of the mat of the other core face is also substantially free of set gypsum, with set gypsum of the core penetrating but part-way into the thickness of the mat. As will be described below, there are manufacturing advantages which accompany the production of gypsum board of such embodiment.

In another embodiment of the aforementioned form of the present invention, the set gypsum of the core penetrates substantially through the thickness of the mat of the other core face over substantial area portions thereof in amounts which are sufficient to coat glass fibers of the mat with a thin film of set gypsum, but not sufficient to form a smooth, continuous coating of set gypsum. This embodiment in which significant portions of the outer surface of the mat have set gypsum thereon provides a protective surface in a two-board package in which the boards are packed together with the gypsum-free surfaces in face-to-face relationship and with the gypsum-covered faces being exposed. More particularly, this preferred form of board comprises a set gypsum core sandwiched between two adhering sheets of porous glass mat of predetermined thickness, each of said mats having an inner and outer surface and comprising randomly distributed glass fibers bonded by an adhesive material, the inner surface of each of said mats being adhered to said gypsum core, and with set gypsum of the core at one surface thereof penetrating substantially through the thickness of one of said mats over substantial area portions thereof and coating substantial area portions of the outer surface thereof and with set gypsum of the core at the other surface thereof penetrating but part-way into the thickness of the other of said mats, the outer surface of the other of said mats being substantially free of set gypsum.

Still another aspect of the present invention comprises a process for making the aforementioned embodiments of gypsum board, that is, the embodiment in which both outer surfaces of the mats are substantially free of set gypsum and the embodiment in which the outer surface of one of the mats is substantially free of set gypsum and that of the other mat has set gypsum thereon. The process includes known steps used heretofore in manufacturing in continuous fashion conventional wallboard and known glass-fiber mat-faced gypsum board, but differs therefrom in that the viscosity of the aqueous gypsum slurry from which the board core is made is controlled in a manner such that the slurry penetrates into the mats to the extent needed to achieve the desired result. The basic steps of the process comprise:

(A) forming an aqueous slurry of calcined gypsum;

(B) continuously feeding said aqueous slurry onto an underlying, moving and supported porous fiber glass mat having a predetermined thickness and an outer surface;

(C) forming said deposited slurry as it is carried on said moving mat into a panel-like shape; and (D) applying to the top surface of said panel-like shape of slurry an overlying porous fiber glass mat of predetermined thickness.

In forming gypsum board in which both of the outer mat surfaces are substantially gypsum-free, the viscosity of the slurry is maintained at a value such that portions of said slurry penetrate but part-way through the thickness of each of said underlying and overlying mats and the panel-like shape of slurry is maintained as the calcined gypsum sets to form a set gypsum core having adhered to its surfaces the underlying and overlying fiber glass mats.

In forming the gypsum-coated/gypsum-free form of glass fiber-faced board, the viscosity of the slurry is maintained at a value such that portions of said slurry penetrate substantially through the thickness of said underlying mat over substantial area portions thereof to coat substantial area portions of the outer surface and at a value such that portions of said slurry penetrate but part-way into the thickness of said overlying mat.

There are numerous advantages which flow from the use of the present invention. An EISystem which includes a fibrous mat-faced gypsum support surface that has affixed thereto insulating material by adhesive only, that is, without fastening means which extend through the insulating material, has higher tensile or cohesive strength than a like system which includes conventional paper-faced gypsum board. Testing of systems of this invention which include insulation in the form of expanded polystyrene panels has shown that initial failure is experienced by a pulling apart of the expanded polystyrene panel, thus evidencing improvement in strength relative to conventional systems where initial failure is experienced in the paper plies of the gypsum support member. The fibrous mat-faced surface of the gypsum support member is water resistant in contrast to conventional paper cover sheets of gypsum board which can soak up water. This improved water resistance gives the applicator greater flexibility in selecting adhesives that can be used to adhere insulation directly to the mat-faced surface of the gypsum support element as adverse affects are not encountered by the use of water-based adhesives. The fibrous mat-faced surface of the gypsum support element is "nailable", and accordingly, it can be secured readily to an underlying frame or other substrate by nailing. In comparison to various of the commercially available systems, the improved support surface of the present invention has improved rigidity and strength uniformity in both the length and width dimensions of the system. Unlike conventional paper cover sheets, the fibrous mat does not expand or contract during the manufacture of the product; this reduces cockle and leads to uniformity of dimensions. The preferred embodiment of the invention which includes the use of a water-resistant core provides a substantially improved weather-resistant product which better resists degradation both within and outside of the system.

BRIEF DESCRIPTION OF THE DRAWINGS

FIG. 1 is a somewhat diagrammatic, fragmentary side elevational view illustrating portions of a manufacturing line for producing gypsum board of a type suitable for use in the manufacture of gypsum board prepared for use in accordance with the present invention;

FIG. 2 is an enlarged fragmentary sectional view, taken as indicated toward the left of FIG. 1, of an underlying fiber glass mat used in the manufacture of the gypsum board;

FIG. 3 is a fragmentary plan view taken as indicated by the line 3—3 on FIG. 2;

FIG. 4 is an enlarged sectional view taken as indicated toward the right on FIG. 1 and illustrating both underlying and overlying fiber glass mats, with intervening gypsum composition, used in the manufacture of the board;

FIG. 5 is a fragmentary plan view taken as indicated by line 5—5 on FIG. 4;

FIG. 6 is a fragmentary bottom view taken as indicated by the line 6—6 on FIG. 4 and illustrating the bottom surface of the underlying mat of the board;

FIG. 7 is a transverse sectional view of an edge portion of the completed board, this view being taken as indicated by the line 7—7 on FIG. 4;

FIG. 8 is a further enlarged fragmentary sectional view taken as indicated toward the top of FIG. 4;

FIG. 9 is a further enlarged fragmentary sectional view taken as indicated toward the bottom of FIG. 4;

DETAILED DESCRIPTION OF THE INVENTION

Figure 10:
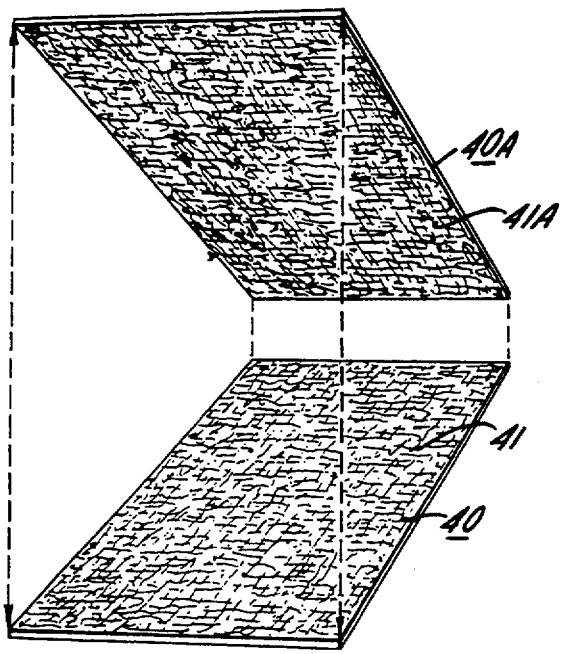
FIG. 10 is a view illustrating two complete gypsum boards fabricated according to the present invention and being assembled for packaging, with the top fibrous mats of the two boards presented toward each other.

The essential components of an EISystem comprise insulating material which is sandwiched between an underlying support surface and an exterior finishing material which can be an integral part of the insulating material, but which is usually applied to the insulating material at the site of installation. From one EISystem to the next, there exist variations in structural details and components. For example, although the exterior finishing material may be affixed directly to the insulating material, various systems include a reinforcing component sandwiched between the exterior finishing material and the insulating material. The reinforcing component comprises generally one or more plies of fiber glass reinforcing fabric or mesh which is adhered by suitable mastic to the surface of the insulating material. In some systems, the support surface is affixed to a wooden frame attached to the exterior surface of the outside wall of a building, whereas in other systems a metal frame is used. In certain applications, the support surface may be affixed directly to the exterior surface of an outside wall, for example, one comprising cinder blocks or concrete blocks. In new construction, the support surface is typically affixed directly to the frame of the building. The adhesive or mastic for adhering together components of the system tends to vary from one system to the next, and typically comprises specially formulated proprietary compositions. The improved support surface of the present invention can be used satisfactorily and to good advantage in EISystems which include overlying plies of insulating and exterior finishing materials, and other optional components.

Presently, the most popularly used insulating material in EISystems is expanded or foamed polystyrene, a material which has good moisture resistant properties. Although it has desirably low water vapor transmission, it is not a vapor barrier, but instead is capable of breathing. Rigid panels of expanded polystyrene are used most widely in EISystems. Such panels have satisfactory compressive strength and resilience and are presently available in thicknesses ranging from ½ to 6 inches, widths from 6 to 48 inches and lengths ranging from 4 feet to 16 feet. One commercially available system utilizes rigid, expanded polystyrene panels which are 2'×4'×1".

Other thermal insulating materials can be used in EISystems also. Examples of such materials include extruded polystyrene, polyurethane, isocyanurate, cement-based insulating plasters, and phenolic foam. Insulating materials generally have low thermal conducting and low density.

As mentioned above, various EISystems include a reinforcing component, for example, in cloth form, sandwiched between the insulating material and the exterior finishing material. Glass cloth is most widely used at the present time to reinforce the system, that is, to improve the impact strength of the system. The particular type or types of glass cloth used and the number of plies thereof which are used depend on the impact resistance which is desired. Examples of reinforcing cloth or fabric which can be used in the system are woven glass, glass fiber skrim and glass fiber mesh. Installation of the reinforcing fabric generally involves applying a suitable adhesive to the surface of the insulating material and then applying the fabric thereto. Additional plies of fabric can be applied if desired. A cement-/acrylic resin is an example of an adhesive that can be used.

The exterior finishing material can be affixed directly to the insulating material or to an intermediate surface such as, for example, the surface of a reinforcing member as described above. The exterior finishing material has weathering characteristics and is preferably appealing in appearance. Presently, the most widely used exterior finish is an acrylic resin-based composition which is available in a paste-type form which is spread or troweled on the underlying substrate. One type of such composition can be described as a ready-mixed synthetic resin plaster. After application, the resin sets to form a tough, weather-resistant solid material which adheres tightly to the underlying substrate. Such resin compositions are available commercially in a variety of colors. They include optionally aggregate which can vary in size. This allows the applicator to choose a particular composition which permits him to apply a finish that can vary in texture from fine to coarse. Finishes which have a stucco-like appearance are popular. Small stones of various colors can be embedded in the composition for decorative purposes.

Examples of other materials that can be used as an exterior finish are Portland cement stucco including, for example, sand and larger aggregate.

The exterior finish can vary in thickness over a wide range, with a thickness of about 1/16" to about ¼" being exemplary.

Turning now to a description of the improved support member for use in exterior systems of the present invention, it comprises a set gypsum core faced with a fibrous mat. The gypsum core is basically of the type used in those gypsum structural products which are known as gypsum wallboard, dry wall, gypsum board and gypsum sheathing. The core of such a product is formed by mixing water with powdered anhydrous calcium sulfate or calcium sulfate hemihydrate (CaSO$_4.\frac{1}{2}$H$_2$O), also known as calcined gypsum, and thereafter allowing the mixture to hydrate or set into calcium sulfate dihydrate (CaSO$_4$.2H$_2$O), a relatively hard material. The core of the support member will in general comprise at least about 85 wt. percent of set gypsum.

The composition from which the set gypsum core is made can include optional constituents, including, for example, those included conventionally in gypsum sheathing. Examples of such constituents include set accelerators, foaming agents, and dispersing agents. As will be described in more detail below, a preferred gypsum core for use in the present invention includes one or more additives which improve the water resistant properties of the core.

The surface of the core to which the insulating material of the system is affixed is faced with a fibrous mat. The fibrous mat should be sufficiently porous to permit water in the aqueous gypsum slurry from which the gypsum core is made to evaporate therethrough. As described in detail below, the gypsum support element for use in the present invention can be made efficiently by forming an aqueous gypsum slurry which contains excess water and placing thereon the fibrous mat. Aided by heating, excess water evaporates through the porous mat as the calcined gypsum sets.

The fibrous mat comprises material which is capable of forming a strong bond with the set gypsum comprising the core of the support surface. Examples of such materials include a mineral-type material such as glass fibers and synthetic resin fibers. The mat can comprise continuous or discrete strands or fibers and be woven or nonwoven in form. Nonwoven mats such as chopped strand mat and continuous strand mat can be used satisfactorily and are less costly than woven materials. The strands of such mats are bonded together by suitable adhesive. The mat can range in thickness, for example, from about 15 to about 40 mils, with a thickness of about 25 to about 35 mils being preferred. The aforementioned fibrous mats are known and are commercially available in many forms.

The preferred fibrous mat is a fiber glass mat comprising fiber glass filaments oriented in random pattern and bound together with a resin binder. Fiber glass mats of this type are commercially available, for example, those sold under the trademark DURA-GLASS by Manville Building Materials Corporation and those sold by ELK Corporation as BUR or shingle mat.

Although improvements in an EISystem can be realized by the use of a gypsum core which has but one of its surfaces faced with fibrous mat as described herein, it is preferred that both surfaces of the core be faced with substantially the same fibrous material. If the surfaces of the core are faced with materials that have different coefficients of expansion, the core tends to warp. Fibrous mat-faced gypsum board and methods for making the same are known, for example, as described in the Canadian Patent No. 993,779 and U.S. Pat. No. 3,993,822.

As mentioned above, the preferred form of the fibrous mat-faced gypsum support surface comprises a gypsum core which has water-resistant properties. The preferred means for imparting water-resistant properties to the gypsum core is to include in the gypsum composition from which the core is made one or more additives which improve the ability of the set gypsum composition to resist being degraded by water, for example, to resist dissolution. In preferred form, the water resistance of the core is such that it absorbs less than 5 percent water when tested in accordance with ASTM method C-473 with only the edges exposed.

The fibrous mat for use in the present invention has substantially better water-resistant properties than the conventional paper facing of gypsum wallboard or sheathing. Nevertheless, evaluations have shown that the bond between the fibrous mat and gypsum core can deteriorate relatively quickly under the influence of water. For example, samples exposed to the weather showed loosening at the glass fiber facing within one to two months. In contrast, evaluations of water-resistant gypsum core faced with fibrous mat in accordance with the present invention have shown the bond between the mat and core resists being degraded by water for indefinite periods of time.

Examples of materials which have been reported as being effective for improving the water-resistant properties of gypsum products are the following: poly(vinyl alcohol), with or without a minor amount of poly(vinyl acetate); metallic resinates; wax or asphalt or mixtures thereof; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; organohydrogenpolysiloxanes; a wax-asphalt emulsion with or without such materials as potassium sulfate, alkali and alkaline earth aluminates, and Portland cement; a wax-asphalt emulsion prepared by adding to a blend of molten wax and asphalt an oil-soluble, water-dispersible emulsifying agent, and admixing the aforementioned with a solution of casein which contains, as a dispersing agent, an alkali sulfonate of a polyarylmethylene condensation product.

A preferred material for use in improving the water-resistant properties of the gypsum core comprises wax-asphalt emulsion, species of which are available commercially. The wax portion of the emulsion is preferably a paraffin or microcrystalline wax, but other waxes can be used also. The asphalt in general should have a softening point of about 115° F., as determined by the ring and ball method. The total amount of wax and asphalt in the aqueous emulsion will generally comprise about 50 to 60 wt. % of the aqueous emulsion, with the weight ratio of asphalt to wax varying from about 1 to 1 to about 10 to 1. Various methods are known for preparing the wax-asphalt emulsion, as reported in U.S. Pat. No. 3,935,021 to D.R. Greve and E.D. O'Neil assigned to the same assignee as the present invention. Commercially available wax asphalt emulsions that can be used in the composition of the present invention are sold by United States Gypsum Co. (Wax Emulsion), Monsey Products, (No. 52 Emulsion) and Douglas Oil Co. (Docal No. 1034). The amount of wax-asphalt emulsion used can be within the range of about 3 to about 10 wt. %, preferably about 5 to about 7 wt. %, based on the total weight of the ingredients of the composition from which the set gypsum core is made, said ingredients including the water of the wax-asphalt emulsion, but not including additional amounts of water that are added to the gypsum composition for forming an aqueous slurry thereof.

A particularly preferred material for use in improving the water-resistant properties of the gypsum core comprises a mixture of materials, namely, poly(vinyl alcohol) and wax-asphalt emulsion of the aforementioned type. The use of such additives to improve the water resistance of gypsum products is described in aforementioned U.S. Pat. No. 3,935,021.

The source of the poly(vinyl alcohol) is preferably a substantially completely hydrolyzed form of poly(vinyl acetate), that is, about 97 to 100% hydrolyzed polyvinyl acetate. The poly(vinyl alcohol) should be cold-water insoluble and soluble in water at elevated temperatures, for example, at temperatures of about 140° to about 205° F. In general, a 4 wt. % water solution of poly(vinyl alcohol) at 20° C. will have a viscosity of about 25 to 70 cp as determined by means of the Hoeppler falling ball method. Commercially available poly(vinyl alcohols) for use in the composition of the present invention are available from E.I. du Pont de Nemours and Company, sold under the trademark "Elvanol" and from Monsanto Co., sold under the trademark "Gelvatol". Examples of such products are Elvanol, Grades 71-30, 72-60, and 70-05, and Gelvatol, Grades 1-90, 3-91, 1-60, and 3-60. Air Products Corp. also sells the product as WS-42.

The amounts of poly(vinyl alcohol) and wax-asphalt emulsion used should be at least about 0.05 wt. % and about 2 wt. % respectively. The preferred amounts of poly(vinyl alcohol) and wax-asphalt emulsion are about 0.15 to about 0.4 wt. % and about 3.0 to about 5.0 wt. % respectively. Unless stated otherwise, the term "wt. %" when used herein and in the claims means weight percent based on the total weight of the ingredients of the composition from which the set gypsum core is made, said ingredients including the water of the wax-asphalt emulsion, but not including additional amounts of water that are added to the gypsum composition for forming an aqueous slurry thereof.

An attractive feature of the present invention is that the fibrous mat-faced gypsum support member can be made utilizing existing wallboard manufacturing lines, for example, as shown somewhat diagramatically in FIG. 1. In conventional fashion, dry ingredients (not shown) from which the gypsum core is formed are pre-mixed and then fed to a mixer of the type commonly referred to as a pin mixer 2. Water and other liquid constituents (not shown) used in making the core are metered into the pin mixer 2 where they are combined with the dry ingredients to form an aqueous gypsum slurry. Foam is generally added to the slurry in the pin mixer to control the density of the resulting core. The slurry 4 is dispersed through one or more outlets at the bottom of the mixer 2 onto a moving sheet of fibrous mat 6. The sheet of fibrous mat 6 is indefinite in length and is fed from a roll (not shown) of the mat.

As is common practice in the manufacture of conventional paper-faced gypsum board, the two opposite edge portions of the fibrous mat 6 are progressively flexed upwardly from the mean plane of the mat 6 and then turned inwardly at the margins as to provide coverings for the edges of the resulting board 40. In FIG. 1, this progressive flexing and shaping of the edges of the mat 6 are shown for only one side edge of the mat and the conventional guiding devices which are ordinarily employed for this purpose are omitted from the figure for the sake of clarity. FIG. 7 shows an edge of the set gypsum core 42 covered by the overlapped edge portion 6A of the mat 6. FIG. 7 shows also score marks 10 and 10A of the mat 6, the score marks permitting the formation of good edges and flat surfaces. The score marks 10 and 10A are made by a conventional scoring wheel 12. An advantage of using the preferred form of glass fiber mat is that it is capable of being scored and edged like conventional paper facing.

Another sheet of fibrous mat 16 is fed from a roll (not shown) onto the top of the slurry 4, thereby sandwiching the slurry between the two moving fibrous mats which form the facings of the set gypsum core 42 which is formed from the slurry. The mats 6 and 16 with the slurry 4 sandwiched therebetween enter the nip between the upper and lower forming or shaping rolls 18 and 20, and are thereafter received on a conveyer belt 22. Conventional edge guiding devices, such as indicated at 24 shape and maintain the edges of the composite until the gypsum has set sufficiently to retain its shape. In due course, sequential lengths of the board are cut and further processed by exposure to heat which accelerates the drying of the board by increasing the rate of evaporation of excess water in the gypsum slurry.

With reference to FIG. 7, it has been observed that the set gypsum of the core 42 is effective in forming satisfactory bonds with the mats and between the edge portions of the overlying mat 16 and the overlapped edge portion 6A of the underlying mat 6, thus making it unnecessary to use a bond improver in the slurry or an edge paste to form the aforementioned bonds.

The preferred form of mats 6 and 16, as shown in FIGS. 2 and 3, comprises glass fiber filaments 30 oriented in random pattern and bound together with a resin binder (not shown).

A preferred form of glass fiber mat-faced gypsum board 40 is shown in FIGS. 4 and 7. It comprises one in which the set gypsum of the core 42 penetrates substantially through the thickness of the mat 6 over substantial area portions thereof and in which the set gypsum of the core 42 penetrates the mat 16 partially, with the surface being thus substantially free of set gypsum. The gypsum-free surface of mat 16, as seen in FIG. 8, is highly textured, and provides an excellent substrate for adhering thereto an overlying component inasmuch as it comprises many interstices into which an adhesive composition can flow and bond.

Figure 11:
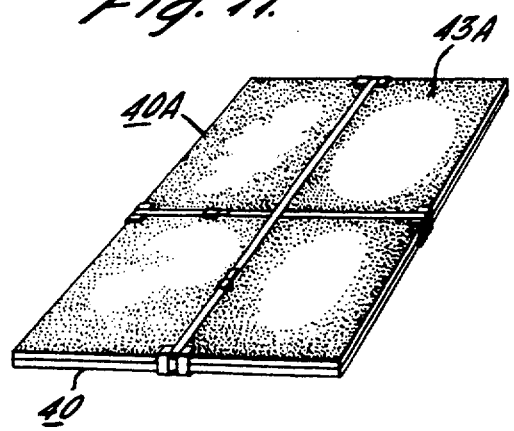
FIG. 11 is a view of two boards assembled in the manner indicated in FIG. 10 and bound together for purposes of shipping.

In shipping gypsum board, it is convenient to package two boards 40 and 40A together (see FIG. 10 and 11), with the glass fiber gypsum-free surfaces 41 and 41A in face to face relationship, and thus protected, and with the gypsum-coated surfaces (for example, 43A in FIG. 11) forming the outside of the package. The set gypsum on the outside surfaces helps to keep the board from being damaged during handling, shipping and storage, and protects the skin of those who come in contact with the board from being irritated by the glass fibers of the mat.

The phrase "substantially penetrated by set gypsum", as used herein, means that the set gypsum of the core, extends from the mat surface which is contiguous to the core to the outer mat surface and coats glass fibers on the outer surface with a thin film of set gypsum to the extent that the outline of glass fibers can be seen through the thin film of set gypsum. The phrase "over substantial area portions of the outer surface", as used herein, means that about 30 to about 75% of the outer surface area of the mat is substantially penetrated by set gypsum. Preferably, about 45 to about 55% of the outer surface area of the mat is substantially penetrated by set gypsum. Accordingly, the gypsum-coated surface of this preferred embodiment of the board comprises a surface that has a roughened or patterned appearance; it does not comprise a smooth continuous coating of set gypsum. This preferred form of board can be formed with relatively small amounts of gypsum slurry being deposited on the underlying support surface, thus minimizing the need to clean the surface.

The need for such cleaning can be substantially avoided by adjusting the viscosity of the slurry so that it penetrates but part-way through the underlying fibrous mat, for example, up to about 50% of its thickness. Thus, this preferred form of board has two gypsum-free fiber-faced surfaces.

The manufacture of the aforementioned preferred forms of board can be accomplished by controlling the viscosity of the aqueous slurry of the calcined gypsum in a manner such that the slurry penetrates the underlying and overlying mats to the desired degree. In manufacturing each of the aforementioned preferred forms of board, the viscosity of the slurry should be such that it penetrates about 10 to 50% of the thickness of the overlying mat over the entire surface area thereof.

The recommended means for controlling the viscosity of the slurry is to add thereto a viscosity-control agent. Such viscosity-control agents are known in the field of gypsum board manufacture. A preferred viscosity-control agent is paper fiber. Examples of other agents that can be used are cellulosic thickeners, bentonite clays and starches.

The particular viscosity values that are used in the manufacturing operation can vary from one application to the next, depending on the porosity of the mat, and the desired penetration of the slurry. Accordingly, for any particular application, the viscosity value is best determined empirically.

In using the preferred form of glass fiber mat, as described above, to manufacture the aforementioned preferred forms of board, developmental work has shown that satisfactory results can be achieved utilizing a gypsum slurry having a viscosity within the range of about 5000 to 7000 cp. As used herein, the viscosity value refers to Brookfield viscosity measured at a temperature of 70° F. at 10 rpm utilizing paddle No. 3. It should be appreciated that the amount of viscosity-control agent added to the slurry to give the desired viscosity will vary depending on the particular agent used and the specific viscosity desired.

In preferred form, the core of the fibrous mat-faced gypsum board has a density of about 40 to about 50 lbs/cubic ft., most preferably about 42 to about 45 lbs/cubic ft. The manufacture of cores having densities within the preferred range can be effected by using known techniques, for example, by introducing an appropriate amount of foam into the aqueous gypsum slurry from which the core is formed. There are weight advantages that can be realized by the use of fibrous mat-faced gypsum board in EISystems in that fibrous mats which are lighter in weight than conventional paper facing are available. For example, the weight of a widely used paper facing in the manufacture of conventional gypsum sheathing is in the range of about 120 lbs/1000 sq. ft. of board, whereas the weight of a preferred form of glass fiber mat for use in the present invention is about 40 lbs/1000 sq. ft. of board.

Figure 12:
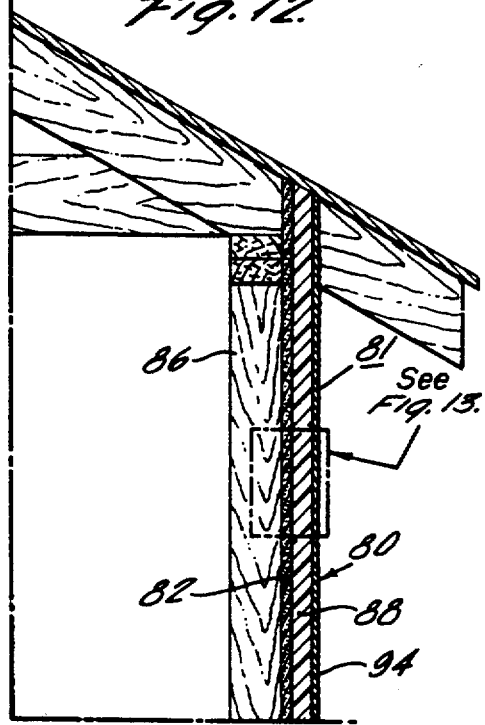
FIG. 12 is a somewhat diagrammatic vertical sectional view through the upper portion of an external building wall, as insulated in accordance with the present invention.
Figure 13:
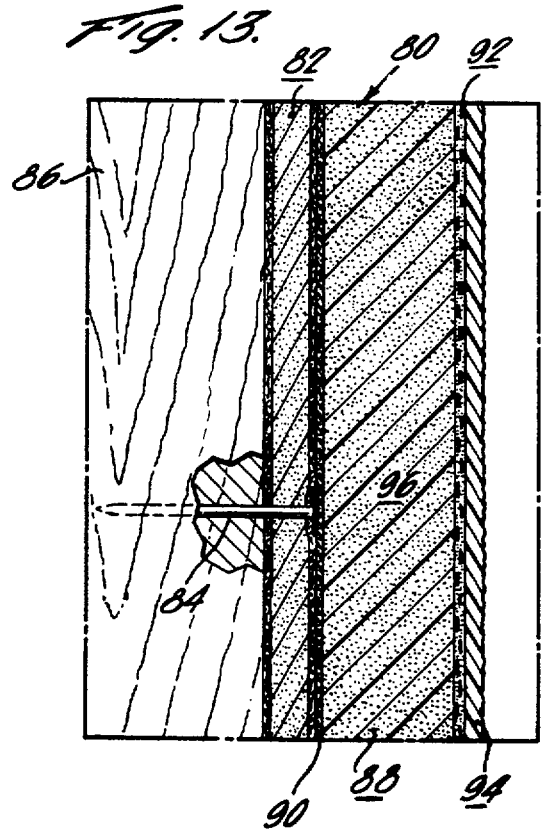
FIG. 13 is an enlarged vertical sectional view taken substantially as indicated on FIG. 12.

Turning now to FIGS. 12 and 13, there is shown therein an example of an exterior insulating system fabricated in accordance with the present invention and comprising the exterior portion of the building 81. The EISystem 80 comprises panels of fibrous mat-faced board 82 affixed by nails 84 to wood framing 86. A foamed polystyrene panel 88, about 1 inch thick, is adhered to the fibrous mat-faced board 82 by adhesive 90. A reinforcing member comprising glass fiber skrim 92 is sandwiched between the polystyrene panel 88 and the final finishing material 94 by adhesive 96.

Various of the preferred forms of the gypsum board of the present invention can be used also to good advantage in place of conventional gypsum sheathing in applications other than EISystems. Thus, the preferred forms of board can be used as an underlying support surface which is covered with overlying finishing materials, for example, aluminum, wood siding, plaster and Portland cement stucco.

EXAMPLES

The formulation set forth below is an example of a preferred aqueous gypsum slurry which can be used in making the core of a gypsum support member in accordance with the present invention.

| Constituents | Lbs./1000 sq. ft. of board |
|---|---|
| calcined gypsum ($CaSO_4 \cdot \frac{1}{2}H_2O$) | 1380 |
| wax/asphalt emulsion | 130 |
| aqueous solution of 10 wt % poly(vinyl alcohol) | 56 |
| paper fiber | 15 |
| set accelerator | 6 |
| ammonium lauryl sulfonate (foaming agent) | 1 |
| calcium lignosulfonate (dispersing agent) | 2 |
| water | 260 |

The wax/asphalt emulsion used in the above formulation contained approximately 48 wt. % solids of which about 11 wt. % was paraffin wax and about 37 wt. % was asphalt. The set accelerator comprised about 80 wt. % potash, about 12 wt. % lignosulfonate and about 8 wt. % ground gypsum.

The above formulation was used to prepare gypsum board, the surfaces of which were covered with nonwoven fiber glass mat. The mat was composed of glass fiber filaments oriented in a random pattern bonded together by an adhesive referred to by the manufacturer as a "modified urea-formaldehyde resin". The mat had a thickness of 33 mils, was more porous than paper of the type used as the cover sheet of gypsum wallboard, and was not significantly weakened by water. The air permeability of the mat was 700 CFM/sq. ft. (test method FG 436-910). The mat is available commercially as DURA-GLASS 7502-2 lbs. and is an example of a preferred fibrous mat for use in the practice of the present invention.

Continuous length board was made from the above gypsum slurry and glass fiber mat on a conventional wallboard machine. The slurry was fed onto a moving sheet of the mat as it was unrolled from a roll onto a moving support surface. The mat had a width of about 51 inches and was scored continuously by conventional scoring blades prior to the deposition of the slurry thereon. Each edge of the mat was scored with two score marks, with each of the outer scores being about 1 inch from its respective edge of the mat and each of the inner scores being about 1½ inch from its respective edge. After the slurry was deposited on the mat, the edges were folded at the score marks and overlapped on top of the slurry. (The gypsum core formed from this operation had a width of 47⅝ inches and a thickness of ½ inch.) Mat from another roll thereof and having a width of 47½ inches was fed onto the top of the gypsum slurry and the overlapped edge portions of the underlying mat. The gypsum slurry penetrated the overlapped edge portions and served to bond the edge portions of the overlying mat to the overlapped edge portions of the underlying mat.

The viscosity of the gypsum slurry was about 5900 cp at 70° F. At this viscosity, the slurry penetrated substantially through some portions of the underlying mat to form a thin film thereof on about 40 to 50% of the area of the outer surface of the mat. As the gypsum in the film set, substantial portions of the outer surface of the mat were covered with a thin film of set gypsum. The surface had a roughened appearance with outlines of the glass filaments being observable underneath the thin coatings of gypsum which covered them. However, at the aforementioned viscosity, the slurry penetrated but a portion (about 5 mils) of the thickness of the overlying mat over the entire area thereof, with no slurry being observed on the outer surface of the mat. As the gypsum set in the intermediate portions of the mat that were penetrated by the slurry, it formed a bond that included a mechanical interlock with the set gypsum core.

The continuous length board is cut into lengths of about 8 feet. Drying of the gypsum board is accelerated by heating in an oven at 350° F. for about 2 hours and until the board is almost dry and then at 200° F. for about 1 hour until it is dried completely. The density of the board is about 43 lb. cu. ft.

The gypsum-free surfaces of panels (2'×2') of glass fiber-faced boards as described above were adhered to panels of expanded polystyrene utilizing two different commercially available adhesive systems. In one system, hereafter "System A", one of the faces of a panel of expanded polystyrene having a thickness of about 1 inch and 2'×2' was smeared with an adhesive mixture comprising cement, sand, and resin binder utilizing a ⅜"×⅜" toothed trowel. The panel was then adhered to the glass fiber-faced gypsum board. Thereafter, glass fiber reinforcing mesh was applied to the other face of the panel of expanded polystyrene and a decorative finish was applied to the mesh.

In the other system, hereafter "System B", the same steps as described above for System A were followed except that an acrylic adhesive was applied to the gypsum-free surface of the board and the polystyrene panel adhered thereto.

Two additional systems like System A and B above were assembled, except that conventional paper-faced gypsum sheathing was substituted for the glass fiber-faced gypsum board in each of Systems A and B.

The integrity of each of the systems was evaluated using 1½"×1½" cross-sectional cubes which were extracted from the systems and which were pulled apart in a tensile test apparatus. The results of the testing are set forth below.

| System | Fiber Glass-Faced Board | Paper-Faced Board |
|---|---|---|
| A | 100% break in the | 66% break in the paper, |

| System | Fiber Glass-Faced Board | Paper-Faced Board |
|---|---|---|
| B | polystyrene panel 100% break in the polystyrene panel | 33% break in the polystyrene 100% break in the paper |

From the above results, it can be seen that the use of the glass fiber-faced gypsum support surface improved significantly the strength of the assembly in that tensile failure was transferred from the paper cover of the gypsum sheathing to the foamed polystyrene, with no failure at all experienced in the glass fiber mat or the gypsum core to which it was adhered. Thus, it should be appreciated that, in accordance with the present invention, the integrity of an EISystem can be improved significantly because it is no longer dependent upon the ply strength of a paper cover sheet, but upon a component having much higher strength.

Glass fiber-faced gypsum boards, made as described above, and with their edges protected, were placed outdoors for several months and exposed to the elements. During that period, the boards were exposed to about 20 inches of rain. After this exposure, the boards were examined and found to be in excellent condition with no signs of deterioration.

Other outdoor tests have shown that glass fiber mat-faced gypsum board in accordance with the present invention and having a core which includes wax-asphalt emulsion as a water-resistant additive better resists deterioration than a like board having a core which includes sodium methyl siliconate as the water-resistant additive.

Gypsum board comprising a set gypsum core faced with a fibrous mat, as described herein, and preferably gypsum board comprising a set gypsum core sandwiched between two sheets of porous glass mat, can be used to particular advantage also as a component of a shaft wall assembly or similar assembly in the interior of a building. In such application, the fibrous mat-faced board can be used to particular advantage in place of conventional paper-faced gypsum core board or shaft liner panels, the core of which generally includes fire-resistant additives. Assemblies of this type generally comprise metal framework or studs for support of the gypsum panels which form the walls of the shafts of elevators, stairwells and the like. Examples of such assemblies are shown in U.S. Pat. Nos. 4,047,355; 4,324,082 and 4,364,212, the disclosures of which are incorporated herein by reference. Fibrous mat-faced board, as described herein, can be used, for example, in the assemblies described in the aforementioned patents, and particularly as the shaft liner panel. For use in such application, the core of the board can include fire resistant additives.

In summary, it can be said that the present invention provides in a practical way important functional improvements in exterior finishing systems for buildings, including particularly exterior insulating systems, and in shaft wall assemblies.

We claim:

1. A gypsum board comprising a set gypsum-containing core sandwiched between two sheets of porous glass mat, each of said mats consisting of randomly distributed glass fibers bonded by an adhesive material, said mats adhered to said set gypsum core by a portion of said set gypsum, at least a first of said mats having an outer surface which is substantially free of set gypsum.

2. The gypsum board of claim 1, wherein a second of said mats comprises an outer surface containing set gypsum permeating over substantial area portions thereof.

3. The gypsum board of claim 1, wherein an outer surface of a second of said mats is substantially free of said set gypsum.

4. The gypsum board of claim 1, wherein said mats comprise a substantially uniform density of randomly oriented glass fibers across a thickness of said mats.

5. The gypsum board of claim 1, wherein said mats comprise non-woven chopped glass strand.

6. The gypsum board of claim 1, wherein said set gypsum core comprises a water-resistant additive.

7. The gypsum board of claim 6, wherein said water-resistant additive imparts to said board sufficient water resistance, such that said core absorbs less than 5 percent of its weight in water when said board is tested in accordance with ASTM Method C-473.

8. The gypsum board of claim 1, wherein said core comprises a fire-resistant additive.

9. An exterior insulation system for a building, comprising a support surface, insulating material having an inner surface and an outer surface, the inner surface of which is adhered to the support surface by an adhesive material, and an exterior finishing material overlying the outer surface of the insulating material, said support surface comprising a gypsum board according to claim 1.

10. The exterior insulation system of claim 9, wherein said insulating material is substantially free of channels penetrating therethrough and between the inner and outer surfaces.

11. An exterior insulation system according to claim 9, wherein said support surface comprises a plurality of the gypsum boards as panels in abutting relationship, with panels of the insulating material in abutting relationship adhered to the substantially gypsum-free outer surfaces of the gypsum board panels, and exterior finishing material having weathering and aesthetic characteristics overlying the panels of insulating material.

12. An exterior insulation system according to claim 9 further comprising a reinforcing member sandwiched between the insulating material and the finishing material.

13. A shaft wall assembly comprising metal framework and the gypsum board of claim 1 supported by said framework.

14. A method for installing an exterior insulation system in a building comprising affixing to said building a gypsum board according to claim 1, affixing insulating material having an inner surface and an outer surface to the gypsum board with an adhesive material, and affixing an exterior finishing material to the insulating material outer surface, wherein said board is affixed such that its substantially gypsum-free outer surface faces away from said building and the insulating material inner surface is adhered to the gypsum-free outer surface of the gypsum board.

15. An exterior finishing system comprising a support surface containing a gypsum board according to claim 1, having an inner and outer surface and an exterior finishing material overlying the outer surface of said board.

16. A gypsum board comprising a set gypsum-containing core sandwiched between two sheets of porous glass mat, each of said mats consisting of randomly oriented glass fibers bonded by an adhesive, said mats having an outer surface and an inner surface and having substantially uniform density between said outer and inner surfaces, said outer surface of a first of said mats being substantially free of set gypsum and said inner surface of each of said mats adhered to said gypsum core by a portion of said set gypsum.

17. A gypsum board comprising a set gypsum core having at least one porous, non-woven glass mat thereon, said mat consisting of randomly distributed glass fibers bonded by an adhesive material, said mat adhered to said gypsum core by mechanical interlocking means formed from a portion of said randomly distributed glass fibers bonded to said set gypsum, whereby an outer surface of said mat is substantially free of set gypsum.

18. A gypsum board comprising a set gypsum core having a sheet of substantially uniformly porous non-woven glass mat consisting of randomly oriented glass fibers bonded by an adhesive, said mat adhered to said gypsum core by a portion of said set gypsum during the fabrication of said core, wherein a gypsum slurry, having a viscosity sufficient to prevent full saturation by said mat, is disposed onto said mat, said mat having an outer surface which is substantially free of set gypsum.

19. The gypsum board of claim 18, wherein said mat consists essentially of randomly distributed glass fibers bonded by an adhesive.

20. The gypsum board of claim 19, wherein said board further comprises a second non-woven sheet of porous glass mat bonded to an oppositely facing side of said set gypsum core by a portion of said set gypsum.

21. The gypsum board of claim 20, wherein said second glass mat contains an outer surface which is substantially free of set gypsum.

22. A gypsum board comprising a set gypsum core having disposed thereon a porous glass mat adhered substantially continuously to said core by a portion of said set gypsum, said mat consisting of a substantially uniform density of randomly distributed, chopped glass fibers bonded by an adhesive material, said mat having an outer facing surface which is substantially free of set gypsum.

23. A gypsum board comprising a set gypsum core having disposed thereon a substantially uniformly porous glass mat consisting of randomly distributed glass fibers bonded by an adhesive material, an inner surface of said mat adhered to said gypsum core by said set gypsum during the forming of said board whereby the viscosity of a gypsum slurry precursor of said set gypsum is controlled to penetrate only part-way into the thickness of said mat whereby an outer surface of said mat becomes substantially free of set gypsum.

24. The gypsum board of claim 23, wherein said core comprises a viscosity control agent.

25. The gypsum board of claim 24, wherein said viscosity control agent comprises paper fiber, cellulosic thickeners, clay, or starch.

* * * * *

Disclaimer 5,371,989—Charles W. Lehnert, Fort Myers, Fla.; Brian G. Randall, Stone Mountain, Ga. USE OF FIBROUS MAT-FACED GYPSUM BOARD IN EXTERIOR FINISHING SYSTEMS FOR BUILDINGS AND SHAFT WALL ASSEMBLIES. Patent dated December 13, 1994. Disclaimer filed October 27, 2000, by the assignee, G-P Cypsum Corporation.

The term of this patent shall not extend beyond the expiration date of Pat. No. 4,810,569.

(*Official Gazette*, January 16, 2001)